United States Patent
Marecki et al.

(10) Patent No.: US 7,252,396 B2
(45) Date of Patent: Aug. 7, 2007

(54) RETROREFLECTIVE ARTICLE HAVING AT LEAST ONE VALVE AND METHOD OF MAKING SAME

(75) Inventors: Paul E. Marecki, Stillwater, MN (US); James G. Mitchell, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 232 days.

(21) Appl. No.: 10/989,667

(22) Filed: Nov. 16, 2004

(65) Prior Publication Data

US 2006/0103935 A1 May 18, 2006

(51) Int. Cl.
*G02B 5/128* (2006.01)

(52) U.S. Cl. .................................. 359/540

(58) Field of Classification Search ............ 359/536
See application file for complete search history.

(56) References Cited

U.S. PATENT DOCUMENTS

| | | |
|---|---|---|
| 1,175,224 A | 3/1916 | Bleecker |
| 2,461,011 A | 2/1949 | Taylor et al. |
| 2,726,161 A | 12/1955 | Beck et al. |
| 2,842,446 A | 7/1958 | Beck et al. |
| 2,853,393 A | 9/1958 | Beck et al. |
| 2,870,030 A | 1/1959 | Stradley et al. |
| 2,939,797 A | 6/1960 | Rindone |
| 2,965,921 A | 12/1960 | Bland |
| 2,992,122 A | 7/1961 | Beck et al. |
| 3,468,681 A | 9/1969 | Jaupain |
| 3,700,305 A | 10/1972 | Bingham |
| 3,700,478 A | 10/1972 | Bingham |
| 3,712,706 A | 1/1973 | Stamm |
| 3,946,130 A | 3/1976 | Tung et al. |
| 4,025,159 A | 5/1977 | McGrath |
| 4,102,562 A | 7/1978 | Harper et al. |
| 4,192,576 A | 3/1980 | Tung et al. |
| 4,202,600 A | 5/1980 | Burke et al. |
| 4,243,618 A | 1/1981 | Van Arnam |
| 4,349,598 A | 9/1982 | White |
| 4,367,919 A | 1/1983 | Tung et al. |
| 4,564,556 A | 1/1986 | Lange |
| 4,576,850 A | 3/1986 | Martens |
| 4,588,258 A | 5/1986 | Hoopman |
| 4,648,932 A | 3/1987 | Bailey |
| 4,758,469 A | 7/1988 | Lange |
| 4,763,985 A | 8/1988 | Bingham |

(Continued)

FOREIGN PATENT DOCUMENTS

| | | |
|---|---|---|
| EP | 0 535 580 A1 | 4/1993 |
| EP | 0 917 888 A2 | 5/1999 |
| GB | 2 277 016 | 10/1994 |
| JP | 2000238214 | 5/2000 |
| WO | WO 94/23677 | 10/1994 |
| WO | WO 02/103108 | 12/2002 |

*Primary Examiner*—Euncha P. Cherry
(74) *Attorney, Agent, or Firm*—Jay R. Pralle; Nicole J. Einerson

(57) ABSTRACT

A retroreflective article having at least one valve is disclosed. Each valve may include a channel extending from a first major surface to a second major surface of the retroreflective material, and at least one movable member proximate the channel. The at least one movable member is movable between a closed position and an open position. When in the closed position, the at least one movable member obstructs at least a portion of the channel. A method of making a retroreflective article having at least one valve is also disclosed.

45 Claims, 4 Drawing Sheets

U.S. PATENT DOCUMENTS

| | | |
|---|---|---|
| 4,770,047 A * | 9/1988 | Arditty et al. ............... 73/800 |
| 4,772,511 A | 9/1988 | Wood et al. |
| 4,775,219 A | 10/1988 | Appeldorn et al. |
| 4,895,428 A | 1/1990 | Nelson et al. |
| 4,931,414 A | 6/1990 | Wood et al. |
| 5,200,262 A | 4/1993 | Li |
| 5,207,852 A | 5/1993 | Lightle et al. |
| 5,283,101 A | 2/1994 | Li |
| 5,344,705 A | 9/1994 | Olsen |
| 5,450,235 A | 9/1995 | Smith et al. |
| 5,572,991 A | 11/1996 | Grilliot et al. |
| 5,674,605 A | 10/1997 | Marecki |
| 5,837,347 A | 11/1998 | Marecki |
| 5,840,405 A | 11/1998 | Shusta et al. |
| 5,888,618 A | 3/1999 | Martin et al. |
| 5,916,399 A | 6/1999 | Olsen |
| 6,009,560 A | 1/2000 | McKenney et al. |
| 6,153,128 A | 11/2000 | Lightle et al. |
| 6,155,689 A | 12/2000 | Smith |
| 6,243,201 B1 | 6/2001 | Fleming et al. |
| 6,263,511 B1 | 7/2001 | Moretti |
| 6,306,459 B1 | 10/2001 | Fleming |
| 2003/0019009 A1 | 1/2003 | Feduzi et al. |

* cited by examiner

RETROREFLECTIVE ARTICLE HAVING AT LEAST ONE VALVE AND METHOD OF MAKING SAME

The present disclosure relates generally to the field of retroreflective articles, and in particular to a retroreflective article having at least one valve and a method of making same.

BACKGROUND

Retroreflective materials have been developed for use in a variety of applications, including road signs, license plates, footwear, and clothing patches. Retroreflective materials are often used as high visibility trim materials in clothing to increase the visibility of the wearer. For example, retroreflective materials are often added to protective garments worn by firefighters, rescue personnel, EMS technicians, and the like.

Retroreflective materials can be particularly useful to increase the visibility of fire and rescue personnel during nighttime and twilight hours. In some situations, however, when firefighter garments are exposed to extreme temperatures during a fire, some impermeable or semi-permeable retroreflective materials may contribute to accumulation of heat and/or fluids inside the garment. Under certain conditions, the trapped heat can result in discomfort or even injury to the skin of a firefighter.

In particular, moisture that has collected under impermeable or semi-permeable retroreflective material may expand or vaporize rapidly when the garment is exposed to extreme temperatures from a fire. If the expanded moisture is unable to quickly escape, the firefighter can be exposed to harmful temperatures. Impermeable or semi-permeable materials on the outside of the garment may constrain the rapid escape of heated moisture vapors, allowing the vapors to be directed toward the firefighter's skin. In some cases, this can result in steam burns or other thermal injury to the skin.

Conventional retroreflective materials, including some perforated retroreflective materials, generally exhibit this phenomenon. Such conventional perforated retroreflective materials include standard retroreflective trim having needle punched holes, laser punched holes, slits, or relatively large holes made with a paper punch. Further, perforating retroreflective materials to make them permeable removes a substantial portion of the retroreflective material, thereby potentially decreasing the conspicuity of the material.

SUMMARY

In general, the present disclosure provides a retroreflective article having at least one valve. The at least one valve may allow fluid and/or heat to vent through the retroreflective article.

In one aspect, the present disclosure provides a retroreflective article that includes a retroreflective material having a first major surface and a second major surface, and at least one valve. The at least one valve includes a channel extending from the first major surface to the second major surface of the retroreflective material, and at least one movable member proximate the channel that is movable between a closed position and an open position. The at least one movable member obstructs at least a portion of the channel when in the closed position.

In another aspect, the present disclosure provides a retroreflective garment including a protective outer layer and at least one retroreflective article attached to the protective outer layer. The at least one retroreflective article includes retroreflective material having a first major surface and a second major surface, and at least one valve. The at least one valve includes a channel extending from the first major surface to the second major surface of the retroreflective material, and at least one movable member proximate the channel that is movable between a closed position and an open position. The at least one movable member obstructs at least a portion of the channel when in the closed position.

In another aspect, the present disclosure provides a method of making a vented retroreflective article. The method includes providing retroreflective material having a first major surface and a second major surface. The method further includes forming at least one valve in the retroreflective material, where forming the at least one valve includes forming at least a first slit in the retroreflective material such that the first slit forms a channel extending from the first major surface to the second major surface of the retroreflective material and at least one movable member that is movable between an open position and a closed position, where the at least one movable member substantially obstructs the channel when in the closed position.

The above summary of the present disclosure is not intended to describe each disclosed embodiment or every implementation of the present disclosure. The Figures and Detailed Description that follow more particularly exemplify illustrative embodiments.

DETAILED DESCRIPTION

The present disclosure provides a retroreflective article having at least one valve. Such valve allows transport of fluid from proximate one surface of the article to the other. Further, such valves may also allow transport of heat from proximate one surface of the article to the other. The at least one valve is positioned or formed in the article such that a minimum amount of retroreflective material is removed from the article.

Both fluorescent and retroreflective visibility enhancement are critical to the safety of firefighters and other emergency responders. Reflective trim material is often attached to garments worn by emergency and other works to enhance visibility. Generally, current trim materials are continuous pieces of material that are usually without interruptions or openings. Such materials may not allow much if any fluid or heat to pass through them. At an emergency scene, first response personnel, such as firefighters, are exposed to moisture from outside their garments as well as to perspiration moisture from inside their garments. Further, first response personnel are, at times, exposed to intense heat energy from external sources and heat generated internally by physical exertion. Increased fluid and heat transport through their garments would improve safety.

The retroreflective articles of the present disclosure can be used for various types of applications and on various types of substrates. For example, the presently described retroreflective articles may be used on running apparel to provide venting of perspiration and heat therethrough for added comfort to the wearer. Alternatively, the described retroreflective articles may be attached to vests or protective garments worn by emergency personnel to provide venting of fluid and/or heat from proximate the wearer to outside the protective garment. Such garments can include a protective outer layer such as an outer shell of a firefighter outfit or a multi-layer thermal control outfit. The retroreflective articles described herein can be attached or placed on a protective garment using any suitable technique, e.g., adhered, sewn, stapled, etc. Further, the described retroreflective articles can be formed in any desirable pattern on the protective garment to provide enhanced visibility both during daytime lighting conditions (i.e., diffuse illumination) or nighttime lighting conditions (e.g., from safety lights, head lamps, etc.).

Figure 1:
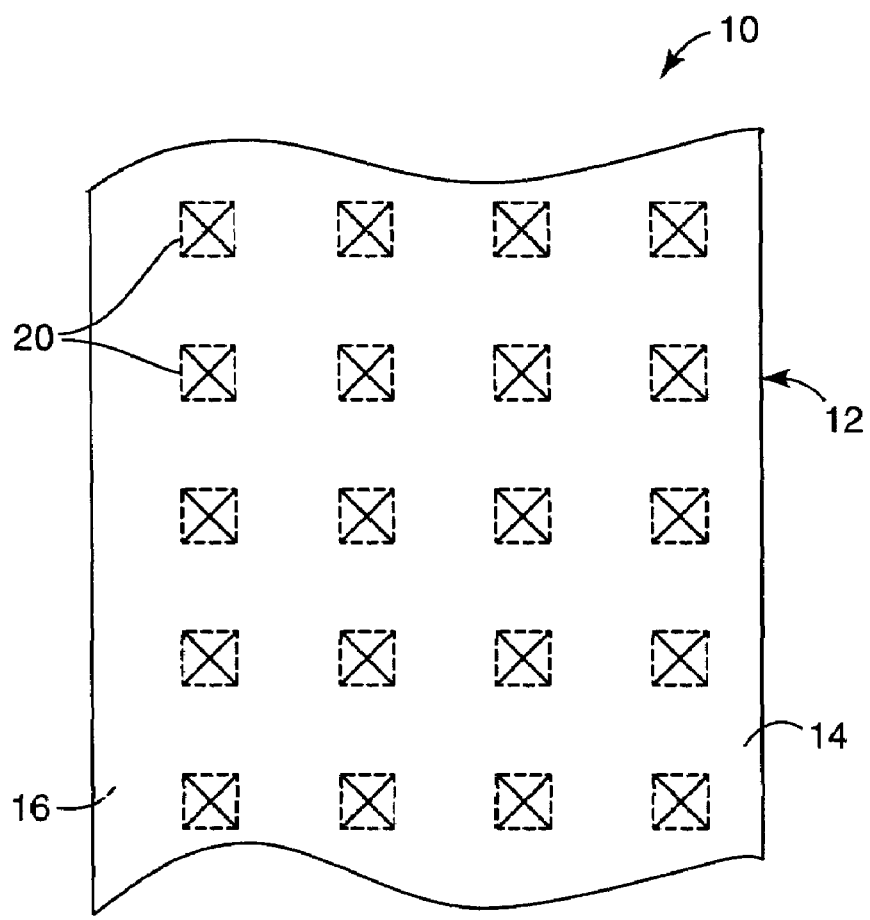
FIG. 1 is a schematic plan view of one embodiment of a retroreflective article that includes retroreflective material and at least one valve.

FIG. 1 is a schematic plan view of one embodiment of a retroflective article 10. The article 10 includes retroreflective material 12 and at least one valve 20 positioned in the retroreflective material 12.

The retroreflective material 12 has a first major surface 14 and a second major surface 16. The retroreflective material 12 may include any suitable type of retroreflective material or materials. In some embodiments, the retroreflective material 12 may include beaded retroreflective material such as those materials described in U.S. Pat. No. 6,153,128 (Lightle et al.). As is further described herein, such beaded retroreflective materials can include a layer of retroreflective microspheres positioned proximate the first major surface 14 of the retroreflective material 12.

In other embodiments, the retroreflective material 12 may include a microprismatic retroreflective material such as those materials described in U.S. Pat. No. 5,888,618 (Martin et al.). As is also further described herein, microprismatic retroreflective materials can include a layer of microprismatic elements proximate the second major surface 16 of the retroreflective material 12.

The at least one valve 20 is positioned in the retroreflective material 12. Any suitable number of valves 20 may be positioned in the retroreflective material 12. In some embodiments, the valves 20 may be positioned in an array. In other embodiments, valves 20 may be formed in any suitable pattern. Alternatively, valves 20 may be randomly positioned in the retroreflective material 12. The valves 20 may also be any suitable size or shape such that the valves 20 are operable to vent fluid and/or heat proximate the second major surface 16 to proximate the first major surface 14 of the retroreflective material 12.

Figure 2:
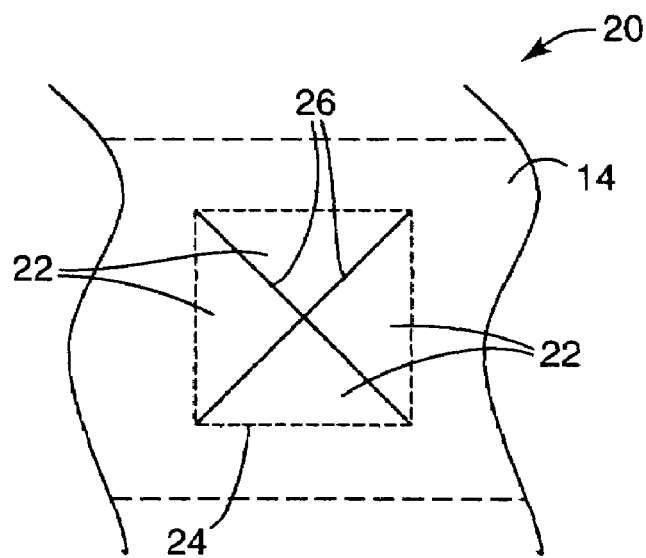
FIG. 2 is a schematic plan view of one valve of the retroreflective article of FIG. 1.
Figure 3:
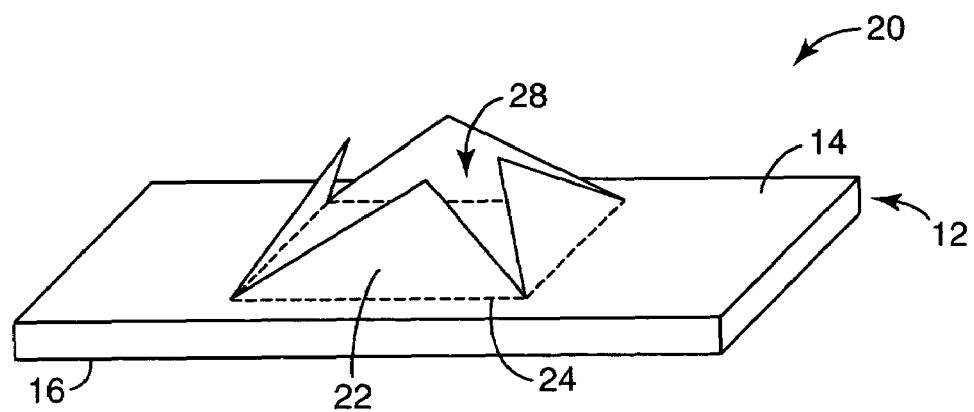
FIG. 3 is a schematic perspective view of one valve of the retroreflective article of FIG. 1.

As is further illustrated in FIGS. 2-3, one valve 20 of FIG. 1 includes a channel 28 that extends from the first major surface 14 to the second major surface 16 of the retroreflective material 12. The channel 28 can be any suitable shape and size as is further described herein.

The valve 20 also includes movable members 22. Each movable member 22 is positioned proximate the channel 28 and is movable between a closed position (as seen in FIG. 2) and an open position (as seen in FIG. 3). When in the closed position, at least one movable member 22 obstructs at least a portion of the channel 28.

Each movable member 22 may take any shape, e.g., rectangular, triangular, circular, polygonal. Further, each movable member 22 may be made of any suitable material or materials, e.g., polymeric, metallic, etc.

In some embodiments, the movable members 22 may be connected to the retroreflective material 12 such that they remain proximate the channel 28 of valve 20. Any suitable technique may be used to connect each movable member 22 to the retroreflective material 12. For example, one or more movable members 22 may be adhered or attached to the retroreflective material 12 using a suitable adhesive or attachment device, e.g., staples, pins, etc. In some embodiments, one or more hinges may be used to connect one or more movable members 22 to the retroreflective material 12. In other embodiments, one or more movable members 22 may be formed from the retroreflective material 12 such that one or more movable members 22 are the same material or materials as the retroreflective material 12. For example, one or more slits 26 or separations may be formed in the retroreflective material 12 such that the retroreflective material 12 is separated to form the movable members 22. In such an embodiment, the movable members 22 may be connected to the retroreflective material 12 by a living hinge 24 that is formed between the movable member 22 and the retroreflective material 12.

The valve 20 may be any suitable valve known in the art. In some embodiments, the valve 20 may include a mechanical valve (e.g., button valve) that is attached to the retroreflective material 12. In other embodiments, the valve 20 may be formed from the retroreflective material 12 using any suitable technique as is further described herein. In the embodiment illustrated in FIG. 2, two slits 26 are formed in an X shape such that the two slits 26 intersect. The two slits 26 form four movable members 22 each having a substantially triangular shape. Any suitable technique may be used to form slits 26 in the retroreflective material 12, e.g., laser cutting, die cutting, or water jet cutting. By providing one or more valves 20 through slitting of the retroreflective material 12, less retroreflective material 12 may be removed than if the retroreflective material 12 were simply perforated to form open holes. Further, perforations formed in the retroreflective material 12 would always be open and, therefore, undesirably allow fluid proximate the first major surface 14 to be directed to proximate the second major surface 16 of the retroreflective material 12.

The at least one valve 20 may take any suitable shape. For example, FIGS. 4A-F illustrate exemplary embodiments of various valves. Valve 120a of FIG. 4A includes three slits 126a that are formed in retroreflective material 112a such that the valve 120a includes three movable members 122a each having a substantially triangular shape. Hinges 124a attach the movable members 122a to the retroreflective material 112a such that the movable members 122a are proximate the channel. Further, the channel formed in the retroreflective material 112a has a substantially rectangular shape.

Figure 4A:
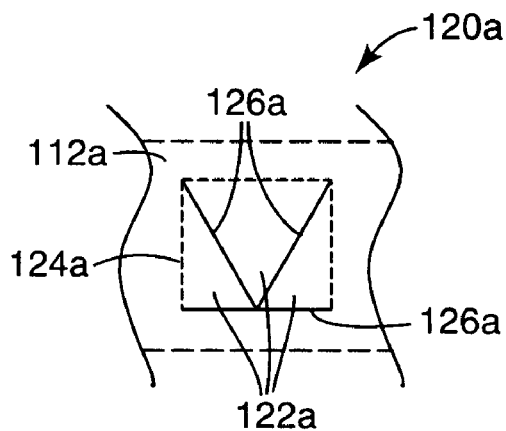
FIGS. 4A-F are schematic plan views of various embodiments of valves.
Figure 4B:
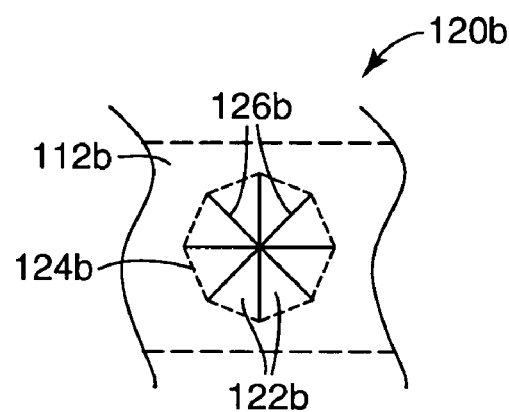
Figure 4C:
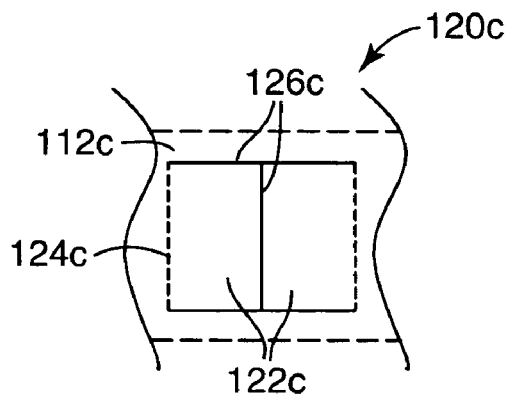
Figure 4D:
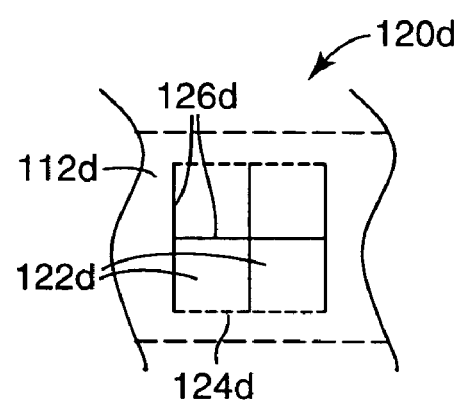
Figure 4E:
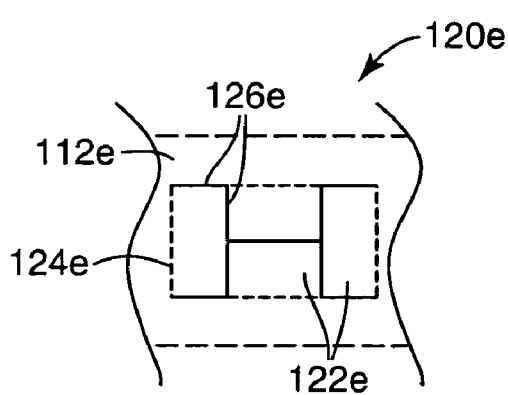
Figure 4F:
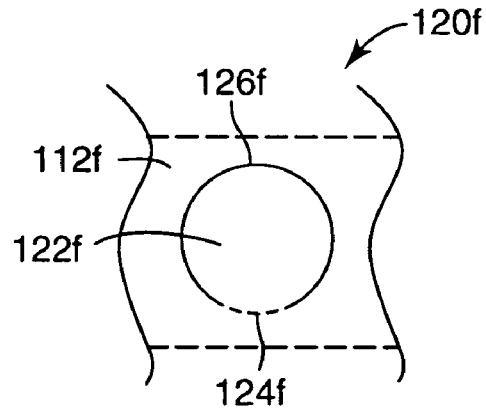

Valve 120b of FIG. 4B is formed by providing four slits 126b in retroreflective material 112b that intersect at a single point. The four slits 126b form eight triangular movable members 122b attached to the retroreflective material 112b by hinges 124b, and an octagonally-shaped channel. FIG. 4C illustrates valve 120c formed from three slits 126c that provide two rectangular movable members 122c attached to retroreflective material 112c by hinges 124c, and a rectangular channel. FIG. 4D illustrates a valve 120d that is formed from four slits 126d, thereby providing four rectangular movable members 122d attached to the retroreflective material 112d by hinges 124d, and a rectangular channel. FIG. 4E illustrates valve 120e formed from seven slits 126e, thereby providing four rectangular movable members 122e, and a rectangular channel. And FIG. 4F illustrates valve 120f formed from one substantially circular slit 126f, thus providing one circular movable member 122f attached to the retroreflective material 112f by hinge 124f, and a circular channel. The valves of the present disclosure can include any suitable channel and movable member shape not limited to the embodiments illustrated in FIGS. 4A-F.

In the embodiment illustrated in FIGS. 1-3, valves 20, when in the closed position, are operable to vent fluid and/or heat proximate the second major surface 16 of the retroreflective material 12 to proximate the first major surface 14. When a sufficient amount of fluid or heat is proximate the second major surface 16 of the retroreflective material 12, the fluid or heat will cause at least one of the movable members 22 to move from the closed position to the open position (as illustrated in FIG. 3). When in the open position, the movable members 22 no longer obstruct at least a portion of the channel 28, thereby allowing fluid and/or heat proximate the second major surface 16 to be directed through the channel 28 such that it is proximate the first major surface 14 of the retroreflective material 12.

This valve action performed by the movable members 22 may be advantageous in environments where excess heat can cause injury. For example, the retroreflective article 10 can be attached to a fire coat or other protective garment such that the second major surface 16 of the retroreflective material 12 is proximate the garment substrate. Fluid, which can collect between the inside of the garment and the skin of the wearer, can expand rapidly when exposed to extreme temperatures produced by a fire. This trapped fluid may be converted to steam that can cause severe burns to the wearer. The valves 20 of retroreflective article 10 may allow such trapped fluid to vent through the garment substrate and the retroreflective article 10.

When in the closed position, the movable members 22 obstruct at least a portion of the channel 28. This obstruction may substantially prevent fluid from venting proximate the first major surface 14 of the retroreflective material 12 to proximate the second major surface 16 of the retroreflective material 12. This may be advantageous in situations where the retroreflective article 10 is attached to fire coats or other protective garments. In the field, firefighters can be exposed to water or other liquids that may impinge upon the retroreflective article 10. The one-way valve action provided by the movable members 22 can substantially prevent such fluids from being directed through the retroreflective article 10 and becoming trapped between the article 10 and the garment substrate.

Any suitable retroreflective material may be used with the present disclosure to form a vented retroreflective article. For example, beaded retroreflective material such as those materials described in U.S. Pat. No. 6,153,128 (Lightle et al.) may have one or more vents placed or formed therein such that the beaded retroreflective material becomes more permeable to fluid and/or heat. Other types of beaded retroreflective materials that may be used with the embodiments of the present disclosure are described in the following U.S. Pat. Nos. 5,837,347; 5,674,605; 6,306,459; 4,102,562; 5,916,399; and 5,344,705.

Beaded retroreflective materials commonly use a monolayer of glass or ceramic microspheres to retroreflect incident light. Typically, the microspheres are partially embedded in a binder layer, and a specular reflecting layer is located between the layer of microspheres and the binder layer. The reflecting layer can be a metal layer (for example, an aluminum coating as disclosed in U.S. Pat. Nos. 3,700,478 and 4,648,932) or an inorganic dielectric mirror made up of one or more layers of inorganic materials that have different refractive indices (as disclosed in U.S. Pat. Nos. 3,700,305 and 4,763,985). Categories of beaded materials include exposed lens, enclosed lens, and encapsulated lens types. Exposed lens beaded materials have a layer of microspheres that are exposed to the environment. Enclosed lens beaded materials have a protective layer such as a transparent polymer resin contacting and surrounding the front side of the microspheres. Encapsulated lens materials have an air gap surrounding the front side of the microspheres and have a transparent film hermetically sealed to a support film to protect the microspheres from water, dirt, or other environmental elements.

Figure 5:
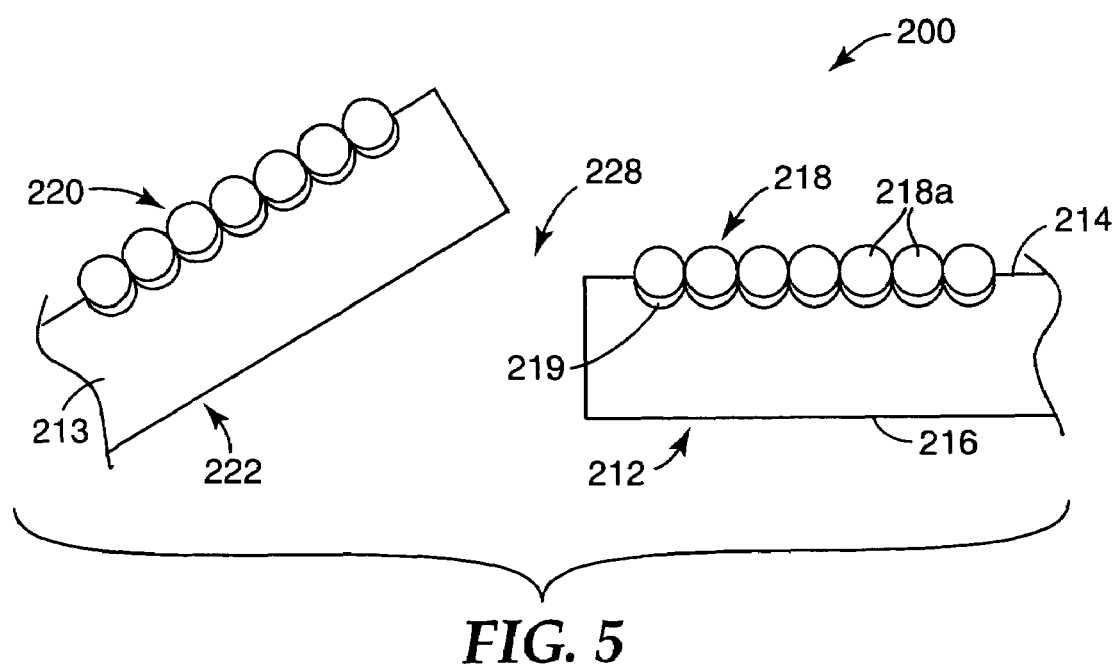
FIG. 5 is a schematic cross-section view of one embodiment of a retroreflective article that includes a beaded retroreflective material and at least one valve.

FIG. 5 is a schematic cross-section view of one embodiment of a retroreflective article 200 that includes a beaded retroreflective material 212 and one or more vents 220 positioned in the retroreflective material 212. A layer of retroreflective microspheres 218 is positioned proximate a first major surface 214 of the retroreflective material 212. The layer of retroreflective microspheres 218, which includes retroreflective microspheres 218a, is partially embedded in a binder layer 213. The layer of retroreflective microspheres 218 may be partially embedded in the binder layer 213 such that the retroreflective microspheres 218a are at any suitable depth in the binder layer 213. Further, the layer of retroreflective microspheres 218 also includes a reflective layer 219 positioned behind at least a portion of the layer of retroreflective microspheres 218 near the embedded portions of the retroreflective microspheres 218a.

The microspheres used in some embodiments of this disclosure are substantially spherical in shape in order to provide the most uniform and efficient retroreflection. The microspheres can be substantially transparent so as to minimize absorption of light so that a large percentage of the incident light is retroreflected. The microspheres often are substantially colorless but may be tinted or colored. The microspheres may be made from glass, a non-vitreous ceramic composition, or a synthetic resin. In general, glass microspheres may be preferred because they tend to be less expensive, harder, and more durable than microspheres made from synthetic resins. Examples of microspheres that may be useful in this invention are disclosed in the following U.S. Pat. Nos. 1,175,224, 2,461,011, 2,726,161, 2,842,446, 2,853,393, 2,870,030, 2,939,797, 2,965,921, 2,992,122, 3,468,681, 3,946,130, 4,192,576, 4,367,919, 4,564,556, 4,758,469, 4,772,511, and 4,931,414.

Microspheres used in the present disclosure typically have an average diameter in the range of about 30 to 200 μm. Microspheres used in the present disclosure typically have a refractive index of about 1.7 to about 2.3.

As mentioned herein, the layer of retroreflective microspheres 218 can have a specularly reflective layer 219 disposed on the embedded portion of the layer of retroreflective microspheres 218. The specularly reflective layer 219 may include any suitable type of reflector, e.g., reflective metal layer, dielectric mirror, etc. The term "reflective metal layer" is used herein to mean a reflective layer including an effective amount of metal to reflect incident light, preferably specularly reflect incident light. A variety of metals may be used to provide a specular reflective metal layer. These metals include aluminum, silver, chromium, nickel, magnesium, gold, and alloys thereof. Aluminum and silver may be the preferred metals for use in the reflective layer. The metal layer 219 should be thick enough to reflect incoming light. Typically, the metal layer 219 is about 50 to 150 nm thick. The reflective metal layer 219 may be formed using any suitable technique (e.g., those techniques described in U.S. Pat. No. 6,153,128).

The reflective layer 219 is disposed on the embedded portion of the layer of retroreflective microspheres 218. In some embodiments, the reflective layer 219 is disposed on the entire embedded portion of the layer of retroreflective microspheres 218. In other embodiments, the reflective layer 219 may be disposed only on a portion of the embedded portion of the layer of retroreflective microspheres 218 as is further described herein.

The binder layer 213 of the retroreflective material 212 typically contains a flexible polymeric material. The binder layer 213 also may contain optional additives such as stabilizers (e.g., thermal and hydrolytic stabilizers), antioxidants, flame retardants, and flow modifiers (for example, surfactants), viscosity adjusters (for example, organic solvents), rheology modifiers (for example, thickeners), and coalescing agents, plasticizers, tackifiers, and the like. Generally, the binder layer contains from about 70 weight percent up to about 99 weight percent of a polymeric material with the remainder being optional additives in effective amounts.

The polymeric material of the binder layer 213 may be a polymer including but not limited to an elastomer. In some embodiments, the polymeric material includes a cross-linked or virtually cross-linked elastomer. Examples of polymer cross-linking include carbon-carbon bond formation such as free radical bonding between vinyl groups between chains; agent or group coupling such as by vulcanization or reaction with a coupling agent such as a diol in the case of isocyanate or epoxy functionalized polymers; a diisocyanate or an activated ester in the case of amine and alcohol functionalized polymers; and epoxides and diols in the case of carboxylic acid or anhydride functionalized polymers. Examples of virtual cross-linking include amide hydrogen bonding as is found in polyamides or crystalline and amorphous region interactions as is found in block copolymers of styrene and acrylonitrile.

Illustrative examples of the polymers that may be employed in the binder layer 213 include polyolefins, polyesters, polyurethanes, polyepoxides, natural and synthetic rubbers, and combinations thereof. Examples of cross-linked polymers include the foregoing examples of polymers substituted with cross-linkable groups such as epoxide groups, olefinic groups, isocyanate groups, alcohol groups, amine groups or anhydride groups. Multifunctional monomers and oligomers which react with functional groups of the polymers may also be used as cross-linkers.

Specific examples of binder layer materials are disclosed in U.S. Pat. Nos. 5,200,262 and 5,283,101. Examples of commercially-available polymers that may be used in the binder layer of the present disclosure include the following: Vitel™ VPE 5545 and VPE 5833 polyesters available from Goodyear Tire and Rubber Company, Akron, Ohio; Rhoplex™ HA-8 and NW-1845 acrylic resins available from Rohm and Haas, Philadelphia, Pa.; Cydrothane™ a polyurethane available from Cytec Industries of American Cyanamide, West Patterson, N.J.; Estane™ 5703 and 5715 available from B.F. Goodrich, Cleveland, Ohio; and Nipol™ 1000, available from Zeon Chemicals, Inc., Rolling Meadows, Ill.

The binder layer 213 typically has a thickness of about 50 to 250 μm. It is to be understood that a binder layer having a thickness outside these ranges may be used; however, if the binder layer is too thin, it may not provide sufficient support to the microspheres, allowing them to become dislodged.

In some embodiments, an adhesive layer (not shown) may be coated over the back or second major surface of the binder layer 213 proximate the second major surface 216 of the retroreflective material 212 to attach the article 200 to a garment or other substrate.

In some embodiments, the binder layer 213 may be colored. The binder layer 213 can be colored by incorporating a dye or pigment therein. Examples of such dyes and pigments that may be used include

| Company | Company Order Number | Colour Index Name | Colour Index Number |
|---|---|---|---|
| BASF Corporation, Cliffton, New Jersey | Sudan ™ Yellow 146 | Yellow 16 | 12,700 |
| | Sudan ™ Yellow 150 | Yellow 56 | 11,021 |
| | Sudan ™ Red 290 | Red 1 | 12,150 |
| | Sudan ™ Blue 670 | Blue 35 | 61,554 |
| Sun Chemical Pigments, | 275-0570 | Pigment Yellow 83 | 21,108 |
| Sun Chemical, Cincinnati, Ohio | 275-0023 | Pigment Yellow 17 | 21,105 |

In some embodiments, the colorant is a highly visible fluorescent dye and/or pigment. Fluorescent dyes and/or pigments can provide enhanced conspicuity under daytime lighting conditions. Examples of fluorescent dyes or pigments that may be used in this invention to color the binder layer include: Day-Glo™ Fire Orange T-14, Rocket Red GT, Blaze Orange GT, and Saturn Yellow T-17, Day-Glo Color Corp., Cleveland, Ohio; Flare™ 911 Cleveland Pigment & Color Co., Akron, Ohio; Lumogen™ F Red 300, F Yellow 083, and yellow S0790 (Pigment Yellow 101, C.I. No. 48052), BASF Corporation, Cliffton, N.J.

As illustrated in FIG. 5, the retroreflective article 200 includes valve 220 that, in this illustrated embodiment, is formed in the retroreflective material 212. The retroreflective article 200 can also include two or more valves as is further described herein. The valve 220 may be any suitable valve described herein. The valve 220 includes movable member 222 and a channel 228 that extends from the first major surface 214 to the second major surface 216 of the retroreflective material 212. Although depicted as having one movable member 222, the valve 220 may include two or more movable members as is further described herein. The movable member 222 is positioned proximate the channel 228 and is movable from a closed position to an open position. As illustrated, the valve 220 is in the open position. When in the closed position, the movable member 222 obstructs at least a portion of the channel 228. The movable member 222 can be any suitable shape and size as is further described herein.

In some embodiments, an upper surface of the movable member 222 can include a portion of the layer of retroreflective microspheres 218 that is positioned proximate the first major surface 214 of the retroreflective material 212. Providing retroreflective microspheres on the upper surface of the movable member 222 can increase the visibility of a person wearing the retroreflective article 200 by increasing the angularity of the retroreflective article 200. In other words, the movable member 222 may be oriented in a slightly different direction than the first major surface 214 of the article 200. This orientation can provide high visibility from a new set of observer locations. The summed effect of many such movable members 222 at many different orientations to the article 200 can result in an improvement in the angularity of the visibility of the garment wearer.

The movable member 222 can be positioned proximate the channel 228 using any suitable technique. In the illustrated embodiment, the movable member 222 is integral with the retroreflective material 212, thereby forming a living hinge with the retroreflective material 212 (not shown).

The valve 220 may be formed using any suitable technique. In some embodiments, the valve 220 includes one or more slits that are formed in the retroreflective material 212 to provide the movable member 222. Any suitable technique may be used to form slits in the retroreflective material 212, e.g., laser cutting, die cutting, or water jet cutting.

Any suitable beaded retroreflective material may be used with the teachings of this disclosure. For example, the valved retroreflective articles of the present disclosure may include retroreflective material having two or more segments that have differing properties See, e.g., U.S. Pat. No. 6,153,128 (Lightle et al.).

Figure 6:
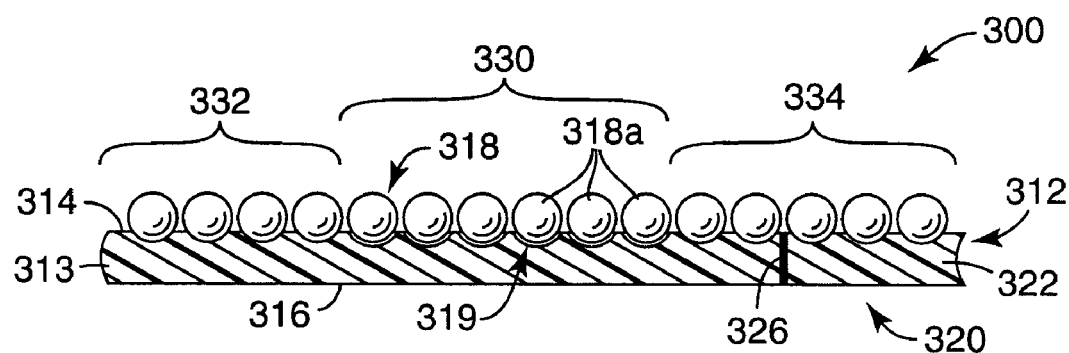
FIG. 6 is a schematic cross-section view of another embodiment of a retroreflective article that includes a beaded retroreflective material and at least one valve.

FIG. 6 is a schematic cross-section view of one embodiment of a retroreflective article 300 that includes a retroreflective material 312 and at least one valve 320. Retroreflective article 300 is similar in many respects to retroreflective article 200 of FIG. 5. The retroreflective material 312 includes a layer of retroreflective microspheres 318 including microspheres 318a, some of which have a reflective layer 319 disposed thereon. The layer of retroreflective microspheres 318 is located proximate a first major surface 314 of the retroreflective material 312 and partially embedded in a colored binder layer 313. The retroreflective material 312 also includes a second major surface 316.

The retroreflective material 312 includes a first segment 330 that includes a portion of the layer of retroreflective microspheres 318 that have the reflective layer 319 located functionally behind the embedded portions thereof. The retroreflective material 312 also includes second segments 332 and 334 that include a portion of the layer of retroreflective microspheres 318 that does not have a reflective layer disposed thereon. In other words, the second segments 332 and 334 lack a reflective layer 319 located functionally behind the embedded portion of the layer of retroreflective microspheres 318. As used herein, the term "functionally behind" means that the reflective layer 319 is positioned on or behind the embedded portion of the microspheres 318a such that the reflective layer 319 is capable of reflecting incident light that passes through the microspheres 318a. Thus, incident light, which passes through the microspheres 318a to strike reflective layer 319, is more strongly retroreflected by segment 330 relative to segments 332 and 334. Without a reflective layer 319 located functionally behind the microspheres 318a in the second segments 332 and 334, the retroreflectivity of such segments typically is on the order of 5 to 15 cd/l/m² when tested in accordance with ASTM E 810-03; whereas, the first segment 330 typically demonstrates a retroreflectivity on the order of 400 to 600 cd/l/m² when similarly tested.

The retroreflective article 300 includes first and second segments that are retroreflective, where the first segment 330 has a reflective layer 319 located functionally behind the embedded portions of the microspheres 318a and the second segments 332 and 334 lack a reflective layer functionally behind the embedded portions of the microspheres 318a. In reference to the position of the reflective layer, the language "disposed on the embedded portion of the layer of microspheres" means that the reflective layer 319 is in direct contact with the microspheres 318a (on the embedded portion) or is in contact with the microspheres 318a through another reflective layer (for example, a dielectric mirror) or a thin, non-reflecting, colorless layer. If a non-reflecting colorless layer is disposed between the microspheres 318a and the reflective layer 319, its thickness is not greater than 20 µm (this is what is meant by "thin"), preferably is less than 10 µm, and more preferably less than 5 µm. If the thin layer does not contribute significantly to the retroreflectivity of the article, it is considered to be non-reflecting.

By having the reflective layer 319 located functionally behind the microspheres 318a in the first segment 330 and not disposed functionally behind the microspheres 318a in the second segments 332 and 334, the first and second segments are able to provide a substantially different degree of retroreflectivity when viewed under retroreflective viewing conditions. What is meant by "substantially different degree of retroreflectivity" is that all lighting conditions being essentially equal, the first and second major segments retroreflect noticeably different amounts of light. Unless the second major segments 332 and 334 possess a reflector behind the microspheres that performs better than the reflective layer 319, the first segment 330 will have substantially better retroreflective efficiency; that is, it will retroreflect a significantly greater amount of incident light. Typically, the first major segment 330 allows a high degree of retroreflectivity to be achieved. By "high degree" is meant the coefficient of retroreflection, $R_A$, exceeds 100 cd/l/m² when the retroreflective article is tested according to ASTM E 810-03 using a 0.2 degree observation angle and a −4 degree entrance angle. "ASTM E 810-03" is a standard test for measuring retroreflectivity of retroreflective articles and is used herein to mean ASTM E 810-03 where the observation angle and entrance angle parameters are as provided above. In some embodiments, $R_A$ of the first segment 330 exceeds 300 cd/l/m². In other embodiments, $R_A$ of the first segment 330 exceeds 500 cd/l/m², when tested in accordance with ASTM E 810-03. In some embodiments, the first and second segments demonstrate differences of $R_A$ of at least 25 cd/l/m². In other embodiments, the first and second segments demonstrate differences in $R_A$ of at least 100 cd/l/m².

Under diffuse illumination, i.e., daytime lighting conditions, the first segment 330 displays the color of the reflective layer 319, typically, grayish or silverish (referred to herein collectively as grayish), and the second segments 332 and 334 display the color of the underlying colored binder layer 313, which, in some embodiments, is fluorescent. In the first segment 330, the reflective layer 319 is opaque and blocks out from view the underlying binder layer 313. In the second segments 332 and 334, however, the color of the colored binder layer 313 is seen through the microspheres 318a, and thus the second segments 332 and 334 display a color noticeably different from the color of the first segment 330 under diffuse illumination. The term "colored binder layer" is used herein to mean the binder layer 313 is colored by some means that allows the second segment (and if present possibly other segments, e.g., third, fourth, fifth, etc.) to display a noticeably different color from the first segment 330 under diffuse illumination. As the term is used herein, "noticeably different color" means the attribute of visual perception that can be described by color is recognized by an ordinary observer as being different. Different shades or hues of the same color may be noticeably different colors under this definition. Color contrast between two different segments may be determined by defining the stimulus value Y for each segment and dividing the higher stimulus value by the lower stimulus value to arrive at the color contrast ratio, $C_c$. Thus, for example, $C_c$ is equal to $Y_2/Y_1$, where $Y_1$ represents the stimulus value of the first segment and $Y_2$ represents the stimulus value of the second segment, $Y_2$ in this instance being greater than $Y_1$. The stimulus values Y may be determined as described in U.S. Pat. No. 6,153,128 (Lightle et al.).

The binder layer 313 can be colored by having an effective amount of a dye or pigment incorporated therein. Alternatively, the binder layer 313 may have a colored film or colored fabric embedded in or disposed beneath a clear polymeric matrix to provide a colored binder layer. In diffuse illumination, the contrast in color between the first and second segments allows an image or configuration of the first segment 330 to be vividly displayed. In nighttime lighting conditions, the first segment 330 can retroreflect light to a significantly greater extent than the second major segments 332 and 334 to make the image of the first segment 330 discernible to a person located near a light source directed at the retroreflective article 300.

The retroreflective article 300 also includes valve 320 formed in the retroreflective material 312. Any suitable valve described herein may be utilized with the embodiment illustrated in FIG. 6. The valve 320 may be formed using any suitable technique described herein. For example, at least one slit 326 may be formed in the retroreflective material 312 to provide at least one movable member 322 and a channel (not shown).

Although illustrated as being formed in second segment 334, valve 320 may be formed in any suitable location in the retroreflective material 312. Further, two or more valves may be formed in the retroreflective material 312 to provide further venting of fluid and/or heat through the retroreflective material 312.

As previously mentioned, any suitable type of retroreflective material may be utilized with the embodiments of the present disclosure. For example, retroreflective material including microprismatic structures (e.g., retroreflective material described in U.S. Pat. No. 5,450,235 (Smith et al.)) may have at least one valve formed therein to provide venting of fluid and/or heat through the retroreflective material.

Microprismatic material typically employs a multitude of microprismatic elements to retroreflect incident light. The microprismatic elements project from the back surface of a body layer. In this configuration, incident light enters the sheet at a front surface, passes through the body layer to be internally reflected by the faces of the microprisms, and subsequently exits the front surface to be returned towards the light source. Reflection at the microprism faces can occur by total internal reflection when the microprismatic elements are encased in a lower refractive index media (e.g., air) or by reflection off a specular reflective coating such as a vapor deposited aluminum film. Illustrative examples of microprismatic or cube-corner sheeting are disclosed in U.S. Pat. Nos. 3,712,706; 4,025,159; 4,202,600; 4,243,618; 4,349,598; 4,576,850; 4,588,258; 4,775,219; and 4,895,428.

Figure 7:
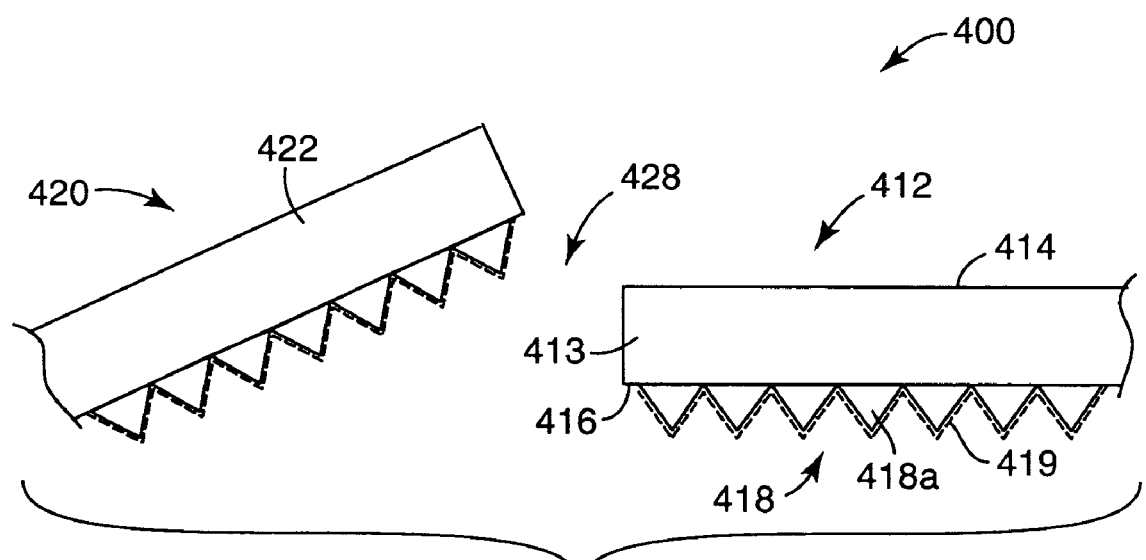
FIG. 7 is a schematic cross-section view of one embodiment of a retroreflective article that includes a microprismatic retroreflective material and at least one valve.

FIG. 7 is a schematic cross-section view of a retroreflective article 400 that includes a microprismatic retroreflective material 412 and at least one valve 420. Any suitable microprismatic retroreflective material may be utilized, e.g., those described in U.S. Pat. No. 5,450,235 (Smith et al.). Retroreflective material 412 includes a body layer 413 and a layer of microprismatic elements 418 positioned proximate a second major surface 416 of the retroreflective material 412. The layer of microprismatic elements 418 includes one or more microprismatic elements 418a.

The body layer 413 may include any suitable material or materials, e.g., those described in U.S. Pat. No. 5,450,235 (Smith et al.). In some embodiments, the body layer 413 includes a light transmissible polymeric material.

The layer of microprismatic elements 418 project from the body layer 413 proximate the second major surface 416 of the retroreflective material 412. Any suitable material or materials may be utilized to form the layer of microprismatic elements 418, e.g., those materials described in U.S. Pat. No. 5,450,235 (Smith et al.). In some embodiments, the layer of microprismatic elements 418 includes a light transmissible polymeric material. Further, in some embodiments, the layer of microprismatic elements 418 and the body layer 413 are made from similar or the same kind of materials.

The layer of microprismatic elements 418 can include a land layer (not shown). The land layer is typically disposed immediately adjacent to the base of the microprismatic elements 418. In some embodiments, the retroreflective material 412 does not include a land layer; therefore, the layer of microprismatic elements 418 includes several discrete microprisms that project from the body layer 413.

In some embodiments, the retroreflective material 412 includes a reflective layer 419 disposed on the layer of microprismatic elements 418. Any suitable material or materials may be used to form the reflective layer, e.g., metallic, polymeric, etc.

The layer of microprismatic elements 418 may include an array of microprisms all having the same size and tilt as described in U.S. Pat. No. 5,450,235. In other embodiments, the layer of microprismatic elements 418 may include one or more microprisms that are oriented differently from neighboring microprisms e.g., those microprismatic arrays described in U.S. Pat. No. 5,840,405 (Shusta et al.).

The valve 420 is positioned in the retroreflective material 412. The valve 420 includes at least one movable member 422 and a channel 428 that extends from first major surface 414 to the second major surface 416 of the retroreflective material 412. Any suitable valve or valves described herein may be used with the embodiment illustrated in FIG. 7. Further, any suitable number of valves may be positioned in the retroreflective material 412.

In some embodiments, the movable member 422 can include retroreflective microprismatic elements projecting from a major surface thereof as is illustrated in FIG. 7. When the movable member 422 is formed from the retroreflective material 412 using techniques described herein, the movable member 422 includes a portion of the layer of microprismatic elements 418 that is proximate the second major surface 416 of the retroreflective material 412.

In general, light impinging upon the first major surface 414 of the retroreflective material 412 passes through the body layer 413 and is incident on one or more internal faces of one or more microprismatic elements 418a. The elements 418a retroreflect the incident light back through the body layer 413 and out of the retroreflective material 412 in a direction generally toward the source of the incident light. When light strikes the movable member 422 when the member 422 is in the open position, such light may get reflected in a direction away from the source of the incident light. This can increase the angular spread of the retroreflected light, thereby increasing the conspicuity of the retroreflective article 400.

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

What is claimed is:

1. A retroreflective article, comprising:
    retroreflective material comprising a first major surface and a second major surface; and
    at least one valve, comprising:
        a channel extending from the first major surface to the second major surface of the retroreflective material, the channel extending through the first major surface and the second major surface such that the first major surface and the second major surface are in fluid communication; and
        at least one movable member proximate the channel that is movable between a closed position and an open position, wherein the at least one movable member obstructs at least a portion of the channel when in the closed position.
2. The article of claim 1, wherein the retroreflective material comprises:
    a binder layer; and
    a layer of retroreflective microspheres positioned proximate the first major surface of the retroreflective material, wherein the layer of retroreflective microspheres is partially embedded in the binder layer.
3. The article of claim 2, wherein the binder layer comprises a colored binder layer.
4. The article of claim 3, wherein the retroreflective article is divided into first and second segments, wherein the first segment comprises a reflective layer located functionally behind the embedded portion of the layer of retroreflective microspheres, and further wherein the second segment lacks a reflective layer located functionally behind the embedded portion of the layer of retroreflective microspheres.
5. The article of claim 4, wherein the reflective layer comprises a reflective metal layer.
6. The article of claim 4, wherein the first and second segments exhibit substantially different degrees of retroreflectivity arid display noticeably different colors when viewed under diffuse illumination.
7. The article of claim 6, wherein the first segment displays a gray color under diffuse illumination, and further wherein the second segment is fluorescent.
8. The article of claim 1, wherein the retroreflective material comprises:
    a body layer; and
    a layer of microprismatic elements positioned proximate the second major surface of the retroreflective material and projecting from the body layer.
9. The article of claim 8, wherein the layer of microprismatic elements comprises a layer of discrete microprismatic elements.
10. The article of claim 8, wherein the body layer comprises a light transmissible polymeric material.
11. The article of claim 8, wherein the article further comprises a reflective layer disposed on the layer of microprismatic elements.
12. The article of claim 8, wherein layer of microprismatic elements comprises a layer of randomly oriented microprismatic elements.
13. The article of claim 1, wherein the at least one movable member is integral with the retroreflective material.
14. The article of claim 13, wherein the at least one movable member forms a living hinge with the retroreflective material.
15. The article of claim 1, wherein the at least one valve comprises a one-way valve.
16. The article of claim 1, wherein the at least one valve is operable to vent fluid proximate the second major surface to proximate the first major surface of the retroreflective material.
17. The article of claim 1, wherein the at least one valve is operable to substantially prevent fluid from venting proximate the first major surface to proximate the second major surface of the retroreflective material.
18. The article of claim 1, wherein the channel comprises a polygonal shape.
19. The article of claim 18, wherein the channel comprises a rectangular shape.
20. The article of claim 18, wherein the channel comprises a triangular shape.
21. The article of claim 1, wherein the channel comprises a circular shape.
22. The article of claim 1, wherein the at least one movable member comprises a polygonal shape.
23. The article of claim 22, wherein the at least one movable member comprises a rectangular shape.
24. The article of claim 22, wherein the at least one movable member comprises a triangular shape.
25. The article of claim 1, wherein the at least one movable member comprises a circular shape.
26. The article of claim 1, wherein the article comprises a plurality of valves.
27. The article of claim 26, wherein the plurality of valves forms an array.
28. The article of claim 26, wherein the plurality of valves are randomly distributed.
29. A retroreflective garment comprising a protective outer layer and at least one retroreflective article attached to the protective outer layer, wherein the at least one retroreflective article comprises:
    retroreflective material comprising a first major surface and a second major surface; and
    at least one valve, comprising:
        a channel extending from the first major surface to the second major surface of the retroreflective material, the channel extending through the first major surface and the second major surface such that the first major surface and the second major surface are in fluid communication; and
        at least one movable member proximate the channel that is movable between a closed position and an open position, wherein the at least one movable member substantially obstructs the channel when in the closed position.
30. The retroreflective garment of claim 29, wherein the retroreflective garment comprises an outer shell of a firefighter outfit.
31. The retroreflective garment of claim 29, wherein the retroreflective garment comprises an outer shell of a multilayer thermal control outfit.
32. A method of making a vented retroreflective article, comprising:
    providing retroreflective material comprising a first major surface and a second major surface;
    forming at least one valve in the retroreflective material, wherein forming the at least one valve comprises forming at least a first slit in the retroreflective material such that the first slit forms
  a channel extending from the first major surface to the second major surface of the retroreflective material, the channel extending through the first major surface and the second major surface such that the first major surface and the second major surface are in fluid communication, and
  at least one movable member that is movable between an open position and a closed position, wherein the at least one movable member substantially obstructs the channel when in the closed position.

33. The method of claim 32, wherein the retroreflective material comprises:
  a binder layer; and
  a layer of retroreflective microspheres proximate the first major surface of the retroreflective material, wherein the layer of retroreflective microspheres is partially embedded in the binder layer.

34. The method of claim 33, wherein the binder layer comprises a colored binder layer.

35. The method of claim 32, wherein the retroreflective material comprises:
  a body layer; and
  a layer of microprismatic elements proximate the second major surface of the retroreflective material and projecting from the body layer.

36. The method of claim 32, wherein forming the first slit comprises laser cutting the first slit in the retroreflective material.

37. The method of claim 32, wherein forming the first slit comprises die cutting the first slit in the retroreflective material.

38. The method of claim 32, wherein forming the first slit comprises water jet cutting the first slit in the retroreflective material.

39. The method of claim 32, further comprising forming a second slit in the retroreflective material such that the second slit intersects the first slit.

40. The method of claim 39, wherein the first and second slit form an X pattern.

41. The method of claim 39, wherein the first and second slit form a V pattern.

42. The method of claim 32, wherein the first slit forms a circular movable member.

43. The method of claim 32, wherein the first slit forms a rectangular movable member.

44. The method of claim 32, further comprising forming a second slit substantially parallel with the first slit and a third slit substantially orthogonal to the first slit and the second slit and intersecting both the first slit and the second slit.

45. The method of claim 32, further comprising forming a second, third, and fourth slit, wherein the first, second, third, and fourth slit all intersect at a single point, and further wherein the first, second, third, and fourth slit form eight triangular movable members.

* * * * *

UNITED STATES PATENT AND TRADEMARK OFFICE
CERTIFICATE OF CORRECTION

PATENT NO. : 7,252,396 B2
APPLICATION NO. : 10/989667
DATED : August 7, 2007
INVENTOR(S) : Paul E. Marecki et al.

It is certified that error appears in the above-identified patent and that said Letters Patent is hereby corrected as shown below:

Column 3,
Line 28, delete "retroflective" and insert -- retroreflective --.

Column 6,
Line 29, delete "retoreflective" and insert -- retroreflective --.

Column 9,
Line 20, delete "properties See," and insert -- properties, see --.

Column 13,
Line 44, delete "arid" and insert -- and --.

Signed and Sealed this

Thirteenth Day of November, 2007

JON W. DUDAS
*Director of the United States Patent and Trademark Office*